United States Patent
Lundeby et al.

(10) Patent No.: US 7,117,302 B2
(45) Date of Patent: Oct. 3, 2006

(54) BOOT TECHNIQUES INVOLVING TAPE MEDIA

(75) Inventors: Bruce A. Lundeby, Fort Collins, CO (US); Lin Zhang, Fort Collins, CO (US); Raymond Henry, Little Elm, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/068,428

(22) Filed: Feb. 28, 2005

(65) Prior Publication Data

US 2006/0195652 A1   Aug. 31, 2006

(51) Int. Cl.
   *G06F 12/00* (2006.01)
(52) U.S. Cl. .......................................... 711/111; 713/2
(58) Field of Classification Search ...................... None
   See application file for complete search history.

(56) References Cited

U.S. PATENT DOCUMENTS 5,373,485 A * 12/1994 Hogan et al. .............. 360/72.2
6,085,318 A * 7/2000 Vander Kamp et al. ........ 713/1
6,490,677 B1 * 12/2002 Aguilar et al. .................. 713/1
6,718,410 B1   4/2004 Slater
2002/0095537 A1   7/2002 Slater
2003/0110370 A1 * 6/2003 Fish et al. ...................... 713/2
2005/0114387 A1 * 5/2005 Evans et al. ................. 707/102

FOREIGN PATENT DOCUMENTS

WO    WO 00/08561    * 2/2000

OTHER PUBLICATIONS

P. Parenteau, "Extensible Firmware Interface," Intel Developer Forum, Spring 2001, Intel Corporation, Feb. 26-Mar. 1, 2001, 23 pp.
V. Zimmer et al., "Cross Platform Management and Provisioning with the Intel Platform Innovation Framework for EFI," Intel Developer Forum, Copyright 2004 Intel Corporation, 48 pp.

* cited by examiner

*Primary Examiner*—Mano Padmanabhan
*Assistant Examiner*—Craig E Walter

(57) ABSTRACT

In at least some embodiments, a system comprises a computer configured to boot using at least one of a plurality of boot techniques involving tape media. The system further comprises a tape drive coupled to the computer and a tape that is readable by the tape drive, wherein the tape is formatted to support a plurality of different boot techniques and wherein at least one of the supported boot techniques is compatible with the computer.

11 Claims, 6 Drawing Sheets

US 7,117,302 B2

BOOT TECHNIQUES INVOLVING TAPE MEDIA

BACKGROUND

Computer systems can benefit from the ability to directly boot from tape media devices for the purpose of system recovery or other system administration operations. However, many computer systems lack the ability to directly boot from tape media devices. This limitation has been handled through various workarounds. For example, one existing tape-based system recovery technique enables systems to be booted from digital versatile disk (DVD) media and recovered from tape media. Another tape-based system recovery technique stores a compact disk read-only memory (CD-ROM) image on the tape and uses a tape drive to simulate a CD-ROM device during a system boot.

Modern computer systems often have the ability to run a number of different operating systems. The requirements of different operating systems and recovery applications place differing demands on the format of boot tapes. For example, some mainframe computers require boot tape formats with specific labeling while some mid-range servers do not allow tape labels. Similarly, some operating systems expect tape media to be labeled while other operating systems do not handle labeling well. Such variations increase the difficulty of managing boot tapes and recovery tapes in a data center tape library or filing system. Thus, systems and methods that enable direct tape booting while adapting to computer system and operating system differences are desirable. Also, systems and methods that are compatible with existing tape-based system recovery techniques such as those mentioned above are desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more parts and may be used to refer to a computer system, a portion of a computer system or a network of computer systems. The term "bootloader" refers to a set of computer-readable instructions that are executed to load an operating system. The term "loadfile" refers to a set of computer-readable instructions that are executed to load a file.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described herein, embodiments of the inventions enable direct booting from a tape device as well as non-direct booting from the tape device. In at least some embodiments, a tape device implements a tape header that allows flexibility in boot tape format in order meet different data center, operating system and boot application needs. The tape device may also store specific files and bootloaders needed by different data centers, operating systems and boot applications.

Figure 1:
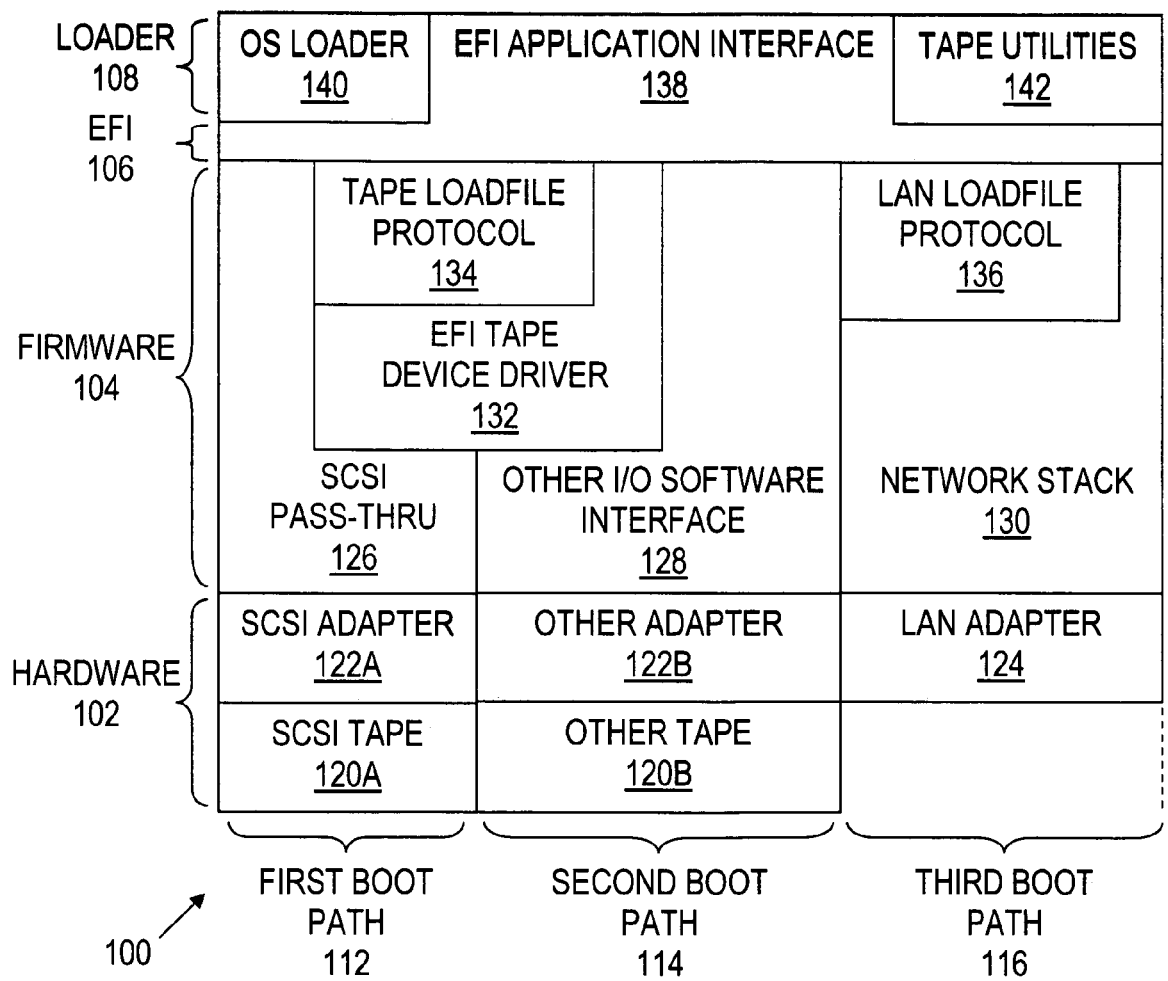
FIG. 1 shows a computer system design structure in accordance with embodiments of the invention.

FIG. 1 shows a computer system design structure 100 in accordance with embodiments of the invention. As shown in FIG. 1, the structure 100 comprises a hardware layer 102, a firmware layer 104, an Extensible Firmware Interface (EFI) layer 106 and an operating system (OS) loader layer 108. To boot the system at least one of a first boot path 112, a second boot path 114 and a third boot path 116 is followed. A description of the boot paths 112, 114 and 116 is provided below.

At the hardware layer 102, the first path 112 comprises a small computer system interface (SCSI) tape device 120A and a SCSI adapter 122A. At the firmware layer 104, the first path 112 comprises a SCSI pass-thru protocol 126. At the firmware layer 104, the first path 112 also comprises an EFI tape device driver 132. The EFI tape device driver 132 presents an EFI tape input/output (I/O) interface to EFI software. In at least some embodiments, the EFI tape I/O interface is based on a Unix or Unix-like tape I/O device model.

As shown, the EFI tape device driver 132 implements a tape loadfile protocol 134. The tape loadfile protocol 134 uses an EFI loadfile interface and creates boot menu entries. The tape loadfile protocol 134 also loads a bootloader and transfers control to an operating system bootloader or another EFI utility acting as a bootloader (e.g., a diagnostic utility).

At the EFI layer 106, the first path 112 comprises an EFI application interface 138 which interfaces an OS (operating system) loader 140 or other tape utilities 142 with the firmware layer 104. The EFI application interface 138 also provides access to EFI tape device driver functionality so that tape utilities such as bootloaders are able to access tape content without an operating system device driver.

In some embodiments, the EFI application interface 138 allows a user to choose a boot option. This boot option indicates an image to load and execute. The loadfile protocol (e.g., the tape loadfile protocol 134 and the LAN loadfile protocol 136) associated with the boot option will load the image. For example, if the boot option is a disk option, the image comprises an OS loader, a diagnostic or an application. If the boot option is a LAN option, the image is provided by a boot server and the LAN loadfile protocol 136 (e.g., a "bootp" protocol) is implemented to load the image from the boot server. If the boot option is a tape option, the tape loadfile protocol 134 retrieves the image from the tape 120A. The OS loader 140 loads an operating system to complete the boot process.

At the hardware layer 102, the second boot path 114 comprises another tape device 120B and another I/O adapter 122B. In some embodiments, the tape device 120B and the I/O adapter 122B may be a FibreChannel-based tape device and I/O adapter. At the firmware layer 104, the second boot path 114 comprises an I/O software interface 128 that is compatible with the I/O adapter 122B and the tape device 120B. For example, the I/O software interface 128 comprises a FibreChannel-compatible software interface if the tape device 120B and the I/O adapter 122B are FibreChannel-based. At the firmware layer 104, the second boot path 114 also uses the EFI tape device driver 132. Thus, the EFI tape device driver 132 is accessible and used in both the first boot path 112 and the second boot path 114. As previously described, the EFI tape device driver 132 may implement a tape loadfile protocol 134.

At the EFI layer 106, the second path comprises the EFI application interface 138 which interfaces the OS loader 140 or the tape utilities 142 with the firmware layer 104. As previously described, the OS loader 140 loads an operating system to complete the boot process. Although SCSI-based and FibreChannel-based tape devices, adapters and firmware are illustrated in the structure 100 of FIG. 1, other embodiments may implement alternative tape devices, adapters and firmware now known or later developed.

At the hardware layer 102, the third boot path 116 comprises a local area network (LAN) adapter 124. At the firmware layer 104, the third boot path 116 comprises a network stack 130 and a LAN loadfile protocol 136. In at least some embodiments, the LAN loadfile protocol 136 performs an anonymous loadfile to access bootloaders on a boot server. At the EFI layer, the third boot path 116 comprises the EFI application interface 138 which interfaces the OS loader 140 with the firmware layer 104. The OS loader 140 loads an operating system to complete the boot process.

Embodiments of the invention are not limited to the boot paths 112, 114 and 116 illustrated in FIG. 1. Rather, the boot paths 112 and 114 illustrate that the EFI tape device driver 132 and the tape loadfile protocol 134 are configured to handle a plurality of different boot paths based on tape devices. FIG. 1 also illustrates that in addition to a plurality of boot paths based on tape devices, a system's structure (e.g., the computer system structure 100) may be configured to boot using a network-based hardware layer 102 and a network-based firmware layer 104. Additionally or alternatively, embodiments may implement an EFI disk bootloader method that uses a named loadfile to access specific files in a file allocation table (FAT). FIG. 1 also illustrates that an EFI application interface 138 may be implemented to interface an OS loader 140 or other tape utilities 142 with any of a plurality of boot paths provided by a system's firmware layer 104.

Figure 2:
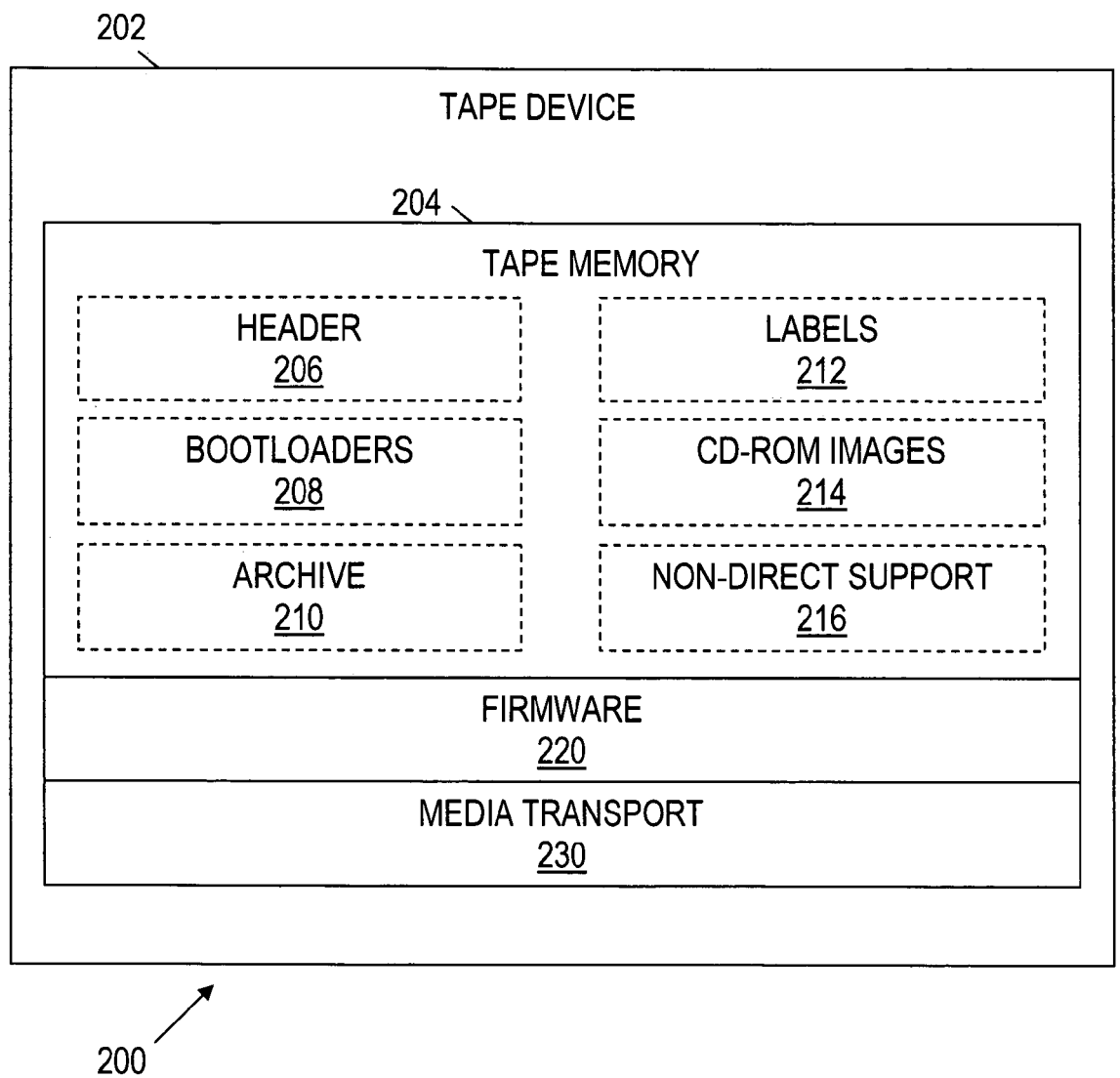
FIG. 2 shows a tape device in accordance with embodiments of the invention.

FIG. 2 shows a tape device 200 in accordance with embodiments of the invention. As shown in FIG. 2, the tape device 200 comprises a cartridge 202 that houses tape memory 204. The tape memory 204 stores a header 206, a bootloader 208 and an archive 210. The memory 204 also stores labels 212, a CD-ROM image 214 and non-direct support instructions 216. In at least some embodiments, the tape memory 204 is configured to store at least several gigabytes (GB) of data.

The tape device 200 also comprises firmware 220 and media transport 230. In at least some embodiments, the firmware 220 enables the tape device 200 to simulate being a CD or DVD device. The media transport 230 moves the tape memory 204 in a sequential manner to access the information stored by the tape memory 204.

The header 206 comprises data fields that identify the tape device 200 as a boot tape and that identify a method used to accomplish system boot. By appropriately defining the criteria of a boot tape and the method used to accomplish system boot, flexibility in boot tape format is provided to meet the differing needs of data centers, operating systems and applications. In at least some embodiments, the header 206 is located within the first twenty data blocks of the tape memory 204.

The bootloaders 208 are EFI executable instructions that, when executed, perform OS-specific boot functionality. In at least some embodiments, the bootloaders 208 obtain data from the tape device 200 using the EFI tape device driver 132 of FIG. 1. For example, the bootloaders 208 may obtain data from the archive 210 which is a set of boot data or recovery data that is provided to a system during a system boot or system recovery. The labels 212 are provided to enable data center software and processes to recognize the tape device 200 and the contents of the tape device 200. In at least some embodiments, the labels 212 are configured to prevent data centers from erasing information contained on tape media which would otherwise not be recognized by computer systems and software. The labels 212 also enable data centers processes such as tracking, library retrieval and operator requests.

The CD-ROM image 214 is provided to enable tape boot methods that are compatible with CD-ROM images to be used with the tape device 200. In at least some embodiments, the CD-ROM image 214 is located near the beginning of the tape memory 204 and enables the tape device 200 to provide direct access media content to computer systems that don't have the ability to directly boot from the tape device 200.

The ability to directly boot from the tape device 200 depends on a computer system's firmware capabilities. If a computer system is unable to directly boot from the tape device 200, the non-direct support instructions 216 provide instructions to support non-direct boot tape methods now known or later developed. For example, in some embodiments, the non-direct support instructions 216 enable booting from DVD media and data recovery from tape media as well as booting from tape media by simulating a CD or DVD device. To simulate a CD or DVD device, the tape device 200 is placed into a simulation mode using, for example, the firmware 220.

In at least some embodiments, the tape memory 204 is configured such that tape format is extensible (i.e., extendable). Thus, as the needs of data centers, operating systems and boot applications change, the tape device 200 is configured to support both old (e.g., legacy) methods and new methods. For example, the bootloaders 208, the archive 210, the labels 212, the CD-ROM images 214 and the non-direct support instructions 216 are extendable to the support the new or changing needs of data centers, operating systems and boot applications. Also, the header 206 is updateable to indicate all supported boot methods as well as the location of files needed to implement a supported boot method.

Figure 3:
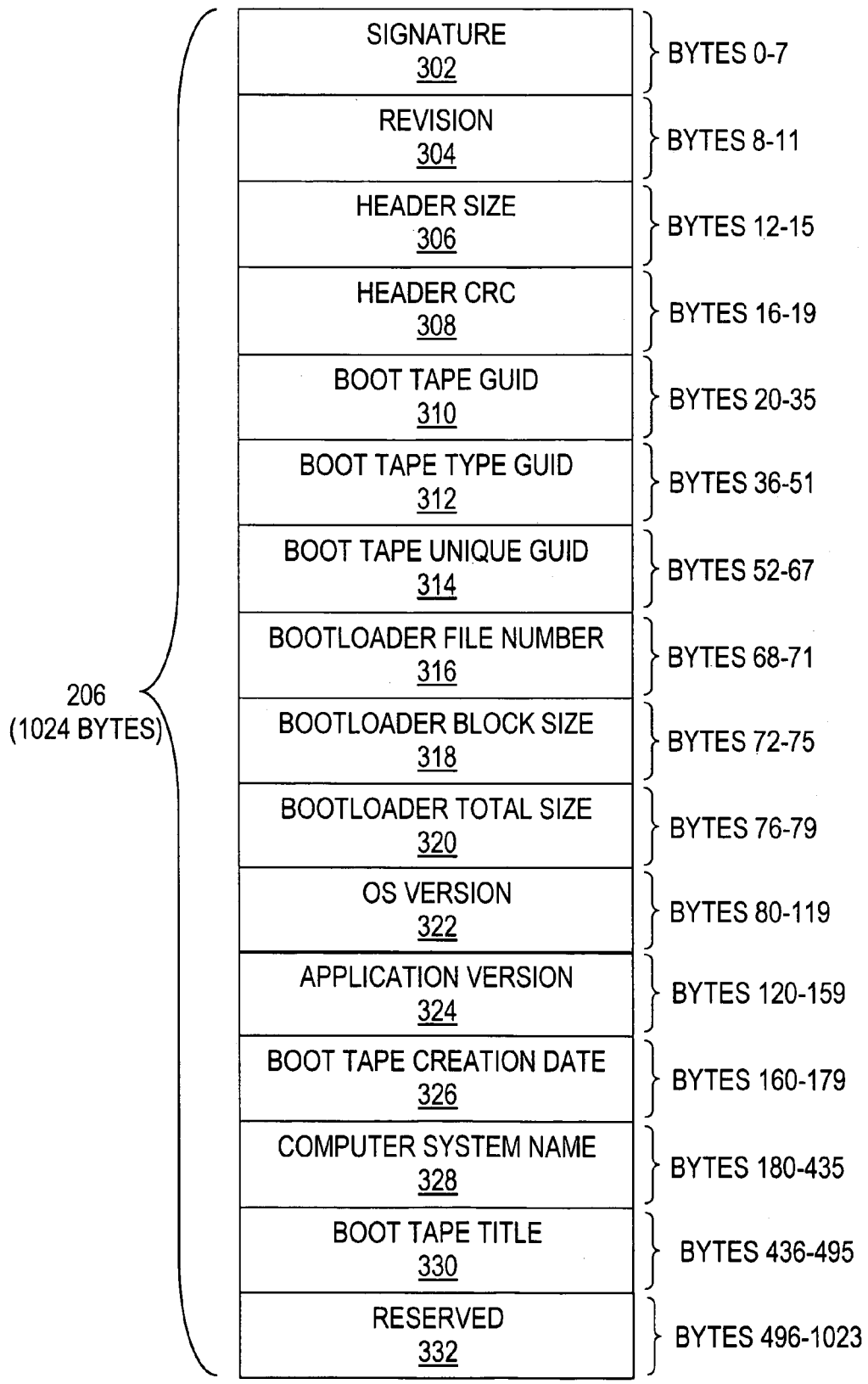
FIG. 3 shows a boot tape header in accordance with embodiments of the invention.

FIG. 3 shows a boot tape header 206 in accordance with embodiments of the invention. As shown in FIG. 3, the boot tape header 206 comprises a plurality of data fields. In at least some embodiments, the boot tape header 206 comprises a "signature" field 302, a "revision" field 304, a "header size" field 306, a "header CRC" field 308, a "boot tape GUID" field 310, a "boot tape type GUID" field 312, a "boot tape unique GUID" field 314, a "bootloader file number" field 316, a "bootloader block size" field 318, a "bootloader total size" field 320, an "OS version" field 322, an "application version" field 324, a "boot tape creation date" field 326, a "computer system name" field 328, a "boot tape title" field 330 and a "reserved" field 332. In at least some embodiments, the total size of the header 206 is predefined to be 1024 bytes.

In at least some embodiments, the signature field 302 has a size of eight byes (bytes 0–7) and identifies the boot tape as an EFI boot tape. For example, the signature may be the characters "EFI BOOT" in American Standard Code for Information Interchange (ASCII). The revision field 304 has a size of 4 bytes (bytes 8–11) and identifies the revision of the header 206 using, for example, an integer value. The header size field 306 has a size of four bytes (bytes 12–15) and identifies the size of the header 206 as an integer value.

The header CRC field 310 has a size of four bytes (bytes 16–19) and provides a high-strength validation that the header is correct and has not been corrupted. The boot tape GUID field has a size of sixteen bytes (bytes 20–35) and identifies a globally unique identifier (GUID) assigned to EFI boot tapes using, for example, a standard EFI GUID value. The boot tape type GUID field 312 has a size of sixteen bytes (bytes 36–51) and identifies a GUID of an EFI boot tape type using, for example, a standard EFI GUID value. In some embodiments, different boot tape type GUIDs are assigned based on a computer system's bootloader and OS in similar manner as a disk partition GUID might be used.

The boot tape unique GUID field 314 has a size of sixteen bytes (bytes 52–67) and identifies a GUID assigned to every EFI boot tape using, for example, a standard EFI GUID. The bootloader file number field 316 has a size of four bytes (bytes 68–71) and identifies a file number of an EFI bootloader using an integer value. In some embodiments, the first file after the header file may be assigned a value of "1" and files containing American National Standards Institute (ANSI) labels or any other content are counted. The bootloader block size field 318 has a size of four bytes (bytes 72–75) and identifies an EFI bootloader block size in bytes using an integer value. The bootloader total size field 320 has a size of four bytes (bytes 76–79) and identifies an EFI bootloader's total size in bytes using an integer value.

The OS version field 322 has a size of forty bytes (bytes 80–119) and identifies an OS version using, for example, ASCII. The application version field 324 has a size of forty bytes (bytes 120–159) and identifies an application version using, for example, ASCII. The boot tape creation date field 326 has a size of twenty bytes (bytes 160–179) and identifies a creation date (e.g., month/day/year/) of an EFI boot tape using, for example, ASCII. The computer system name field 328 has a size of 256 bytes (bytes 180–435) and identifies the name of a computer system associated with the bootloader using, for example, ASCII. The boot tape title field 330 has a size of sixty bytes (bytes 436–495) and identifies an EFI tape's title using, for example, ASCII. The reserved field 332 has a size of 528 bytes (bytes 496–1023) and is reserved for future use. This reserved space allows the header to have a size convenient for tape devices and to allow future content to be added without changing the header size.

Embodiments of the invention are not limited to the header fields 302–332 (even numbers) illustrated in FIG. 3. Rather, the header fields 302–332 (even numbers), illustrate one of many possible header embodiments that appropriately define the criteria of a boot tape and the methods' used to accomplish system boot. The header 206 illustrated in FIG. 3 allows system firmware to correctly handle boot tapes while providing flexibility in boot tape format to meet the differing needs of data centers, operating systems and applications. In at least some embodiments, tape labels (e.g., ANSI tape labels) are selectively used to indicate boot tape and recovery tape contents. Thus, the header 206 is also compatible with data centers that require labels and data centers that require no labels.

Supporting different recovery methods on a single media (e.g., a boot tape) reduces customer confusion during creation and use of the recovery archive since one tape device (i.e., one volume) may be created which is capable of supporting a variety of boot and recovery methods. Thus, users do not need to decide what boot method is to be used at the time the media is created. By providing a single tape media that supports multiple boot methods, users do not need to create and manage multiple tape media to support different methods. Also, application development and testing is simplified since there is no need to handle incorrect combinations of tape media and boot methods. Also, legacy (including non-direct) approaches for tape booting and recovery can continue to be supported along with direct tape booting and data recovery. For example, in at least some embodiments, the header 206 enables a single tape media to support existing tape-based system recovery techniques (e.g., systems that are booted from DVD media and recovered from tape media and systems that are booted by storing a CD-ROM image on tapes) as well as direct boot tape and data recovery.

Figure 4:
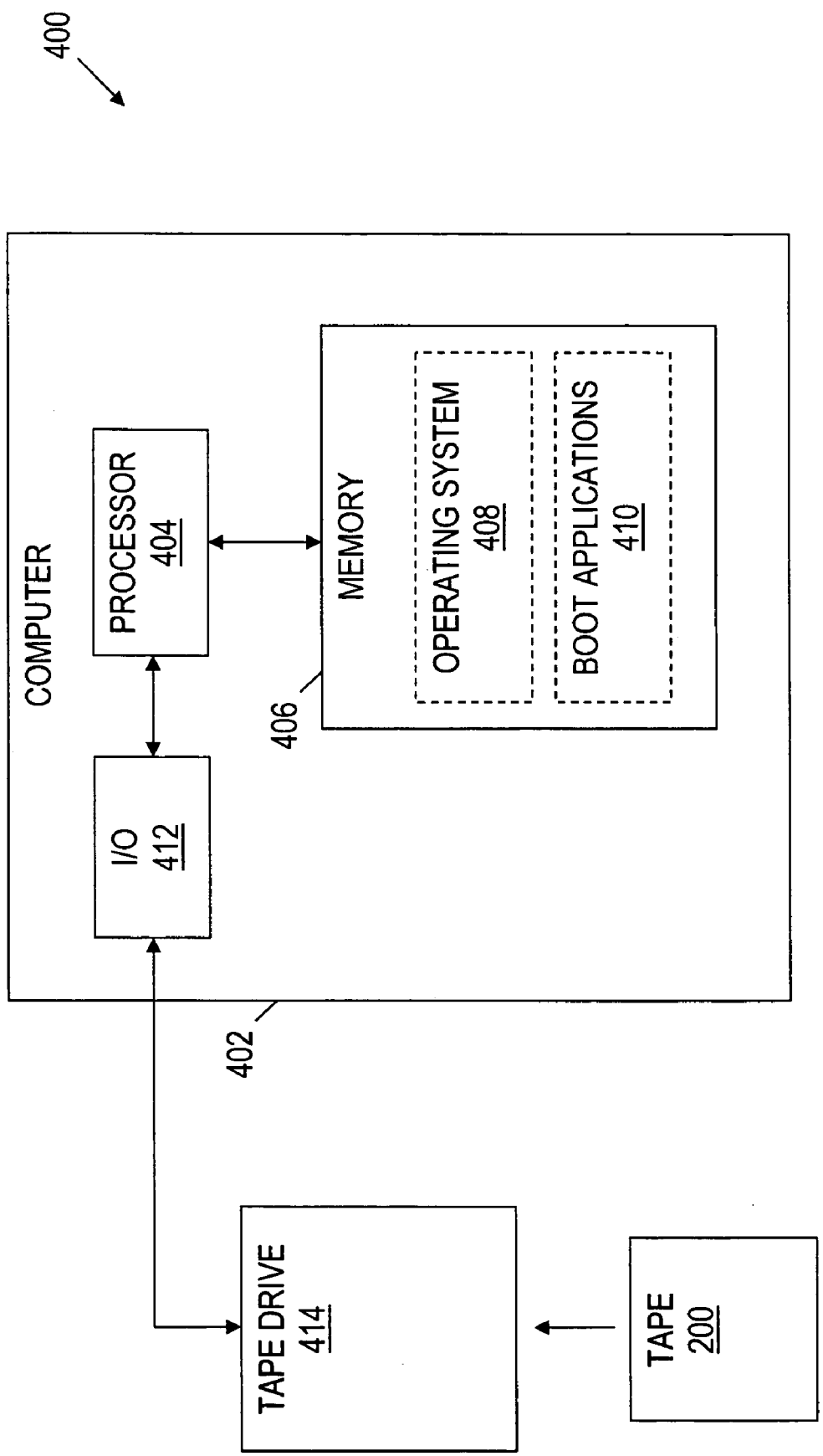
FIG. 4 shows a system in accordance with embodiments of the invention.

FIG. 4 illustrates a system 400 in accordance with embodiments of the invention. As shown in FIG. 4, the system 400 comprises a computer 402 having a processor 404 coupled to an I/O port 412 and to a memory 406. The memory 406 stores an operating system 408 and at least one boot application 410 that are executable by the processor 404. The system 400 further comprises a tape drive 414 that couples to the I/O port 412 of the computer 404. The tape drive 414 is configured to read a tape device 200.

The tape device 200 stores data (e.g., a header, bootloaders, labels, non-direct support instructions, CD-ROM images, archived data) that enables the computer 402 to boot and/or to recover data after a system "crash" (i.e., when the computer 402 ceases to function properly). Additionally or alternatively, the tape device 200 provides initial critical data to the computer 402 (e.g., prior to use by a customer) that configures the computer to function as desired. In at least some embodiments, the tape device 200 supports different data centers, operating systems and boot applications. For example, a header (e.g., the header 206) of the tape device 200 may allow the computer 402 to select one of a plurality of boot methods supported by the tape device 200. In at least some embodiments, the computer 402 selects a boot method by selecting a device to boot from (e.g., a tape, a CD or a DVD). As previously described, not all computer systems support direct booting from a tape due to firmware constraints. The information stored by the tape device 200 enables direct and non-direct booting methods by providing labels, files, bootloaders or instructions that are unique to data centers (e.g., the tape drive 414 may be part of a data center associated with the computer 402) as well as the operating system 408 and the boot applications 410.

Figure 5:
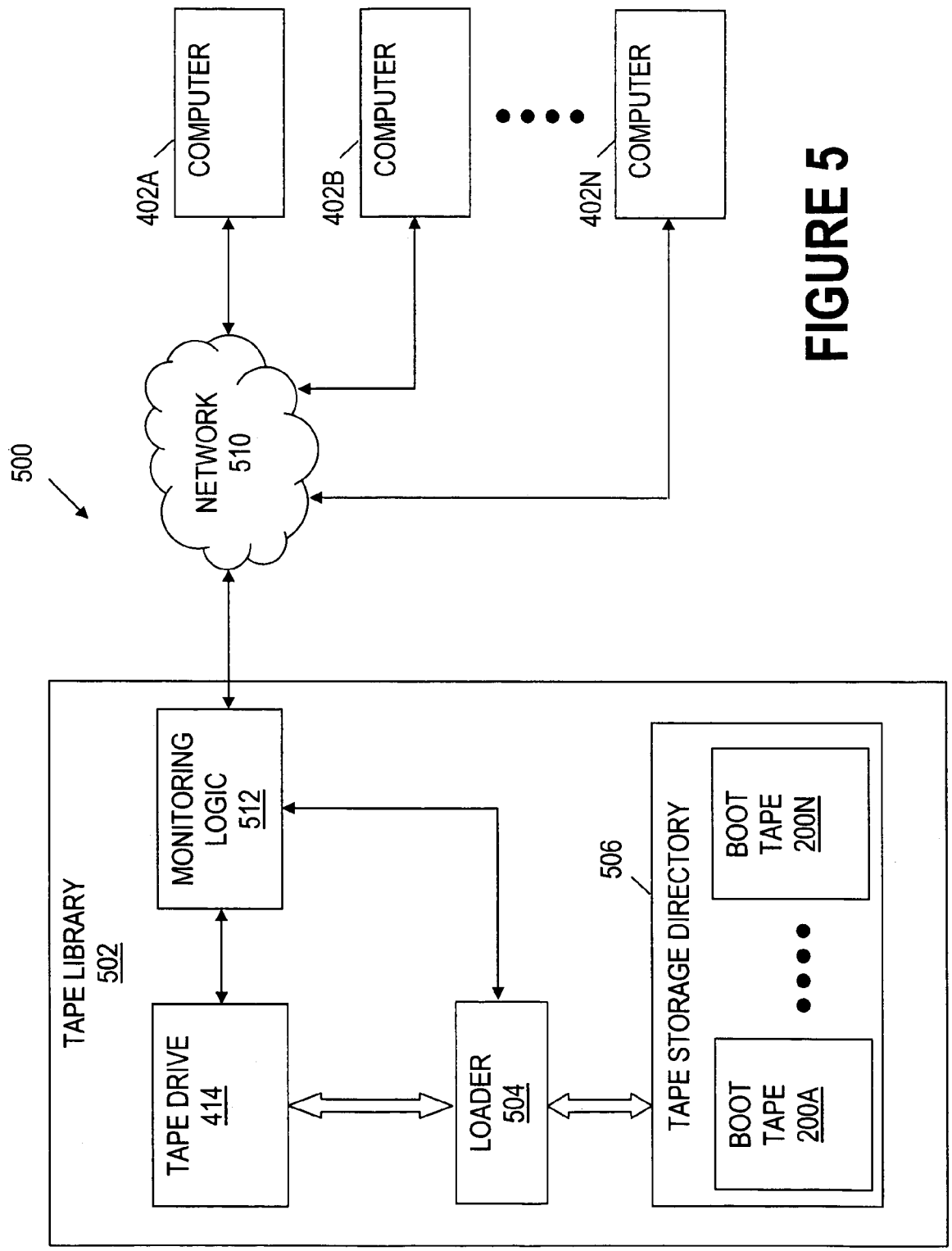
FIG. 5 shows another system in accordance with alternative embodiments of the invention.

FIG. 5 illustrates another system 500 in accordance with alternative embodiments of the invention. As shown in FIG. 5, the system 500 comprises a plurality of computers 402A–402N that couple to a network 510. The network 510 couples to a tape library 502 that stores tape devices 200A–200N associated with the computers 402A–402N. For example, the tape device 200A may be associated with the computer 402A, the tape device 200B may be associated with the computer 402B and so on.

As shown, the tape library 502 comprises monitoring logic 512 coupled to a tape drive 414 and to a loader 504. The loader 504 acts as an interface between the tape drive 414 and a tape storage directory 506 which holds the tape devices 200A–200N. For example, in some embodiments, the loader 504 is configured to automatically retrieve a given boot tape, place the given boot tape in the tape drive 414 and later return the given boot tape to its location in the tape storage directory 506.

As the computers 402A–402N operate, one or more of the computers 402A–402N may crash or may need data recovery. For example, if the computer 402A crashes, the monitoring logic 512 detects the crash and alerts the loader 504 to retrieve the tape device 200A. The loader 504 thereafter retrieves the tape device 200A and places the tape device 200A in the tape drive 414. The tape drive 414 reads a header of the tape device 200A to identify if the tape device 200A supports booting and, if the tape device 200A is compatible with the computer 402A, to identify information such as supported operating systems and/or supported boot methods. Based on the information in the header, the tape drive 414 locates a bootloader stored on the tape device 200A and reads the bootloader in a manner compatible with the computer 402A. For example, in some embodiments, the information in the header identifies the file location of the bootloader, the total size of the bootloader and the block sizes associated the bootloader's data blocks.

After the boot or data recovery of the computer 402A is complete, the loader 504 retrieves the tape device 200A from the tape drive 414 and returns the tape device 200A to the tape storage directory 506. If another computer needs servicing, the loader 504 retrieves the appropriate boot tape and the process continues. Thus, the tape library 502 enables dynamic booting and data recovery of the computers 402A–402N without user intervention. In some embodiments, each tape device 200A includes labels that allow other computer systems and application software (e.g., data center computers and processes) to recognize that the boot tape contains valid information. If the valid information is compatible with a computer system or software application, the valid information may be accessed.

In at least some embodiments, multiple tape libraries are used. In such embodiments, each tape library may have different requirements for boot tape formats. Also, each of the computers 402A–402N may have different requirements for boot tape formats based on which operating system and boot application is being used. To reduce the complexity of creating and using boot tapes for each type of tape library, operating system and boot application, a flexible tape header is used (e.g., the header 206). This tape header implements data fields that allow the different requirements of tape libraries, operating systems and boot applications to be accounted for and handled appropriately.

In at least some embodiments, the computers 402A–402N are associated with the same or similar data centers, operating systems, boot applications or boot methods. In such embodiments, each computer 402A–402N does not need its own tape device 200A–200N. Rather, a single boot tape may be used to boot (or recover data for) some or all of the computers 402A–402N.

Figure 6:
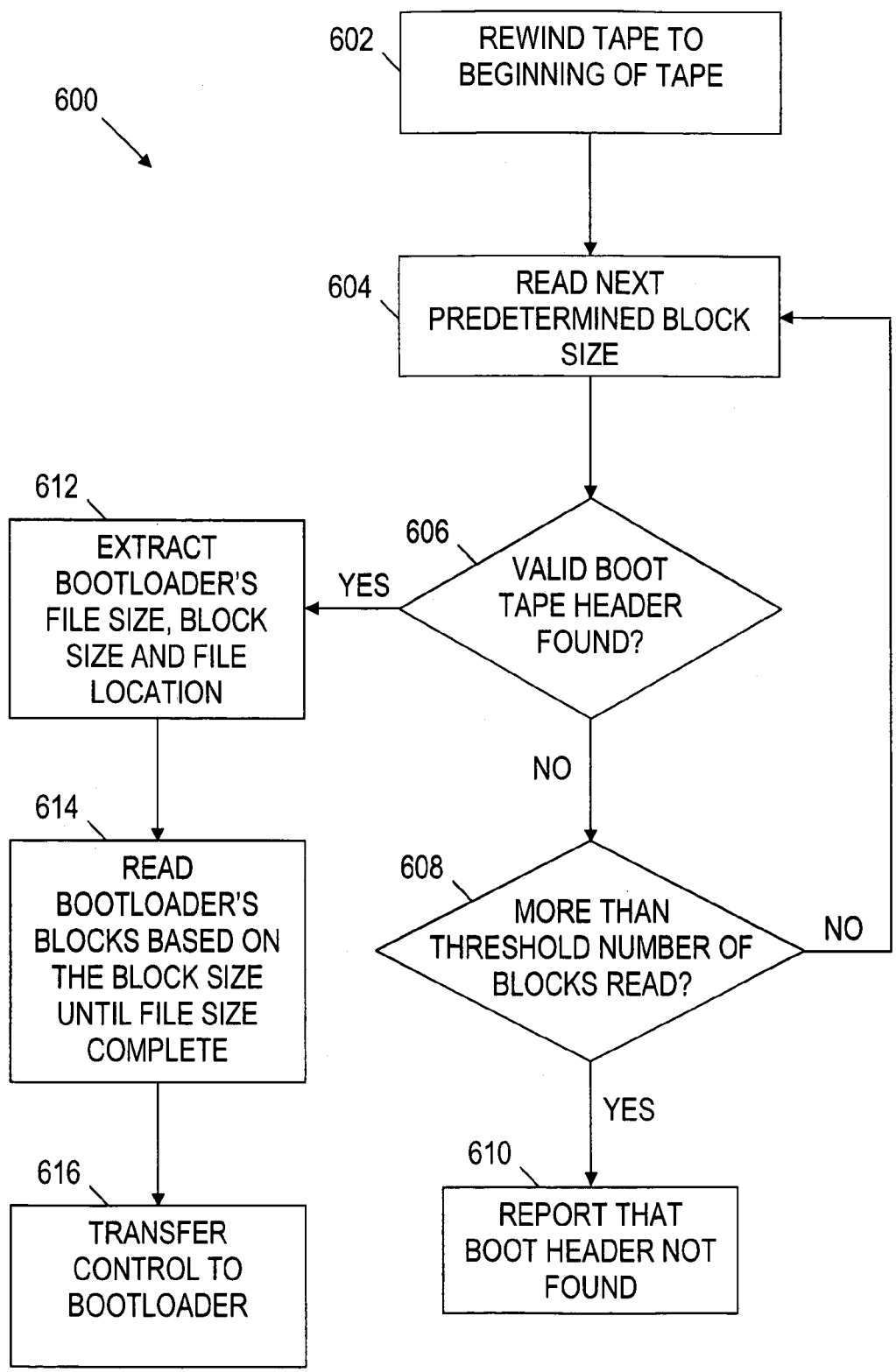
FIG. 6 shows a method in accordance with embodiments of the invention.

FIG. 6 shows a method 600 in accordance with embodiments of the invention. In at least some embodiments, the method 600 is implemented by the tape loadfile protocol 134 previously described in FIG. 1. As shown in FIG. 6, the method 600 comprises rewinding a tape to the beginning of the tape (block 602). The method 600 further comprises looking for a tape header by reading a next predetermined block size (block 604). As previously mentioned, in some embodiments, the predetermined block size is 1024 bytes. Alternatively, a variable block size read could be used to handle changing the tape header size. If a valid tape header is not found (determination block 606), the method 600 determines whether a threshold number of data blocks has been read (determination block 608). For example, the threshold number of data blocks may be set to twenty data blocks. If more than the threshold number of data blocks has been read (determination block 608), the method 600 reports that a tape header is not found (block 610). This is an indication that the tape is not a compatible boot tape. Thus, the method 600 enables a computer system to quickly determine whether a tape media is or is not a boot tape while still allowing considerable flexibility in the boot tape format.

If more than the threshold number of data blocks has not been read at determination block 608, the next predetermined block size is read (block 604). If a valid boot tape header is found at determination block 606, a bootloader's file size, data block size and file location is extracted from the boot tape header (block 612). Thereafter, the bootloader's data blocks are read based on the extracted data block size until the file size is completely read (block 614). Finally, control is transferred to the bootloader (block 616).

The method 600, therefore, determines if a tape is a boot tape and, if a tape is a boot tape, the method 600 locates the bootloader on the boot tape. Advantageously, the method 600 is compatible with boot tape formats used by different data centers, operating systems and boot applications. The method 600 also allows direct booting and is compatible with labeling using, for example, ANSI (although labeling in not required).

The above discussion is meant to be illustrative of the principles and various embodiments of the present invention. Numerous variations and modifications will become apparent to those skilled in the art once the above disclosure is fully appreciated. For example, although tape devices are illustrated in the figures, other sequential access media could alternatively be used. It is intended that the following claims be interpreted to embrace all such variations and modifications.

What is claimed is:

1. A tape device, comprising:
    tape memory, wherein the tape memory is formatted to support a plurality of different boot techniques;
    wherein the tape memory comprises a header that identifies different boot techniques that are supported by the tape device and locations of files associated with each of the different boot techniques;

wherein the header comprises,
a first information frame that identifies the tape device as a boot tape;
a second information frame that identifies the plurality of different boot techniques supported by the tape device;
a third information frame that identifies a location of a bootloader compatible with each of the plurality of different boot techniques, the bootloader being located on the tape device; and
a fourth information fine that is extendable to support additional boot techniques.

2. The tape device of claim 1 wherein the tape memory supports direct booting techniques and non-direct booting techniques.

3. The tape device of claim 1 wherein the tape memory is formatted to provide extensible support to changing boot techniques.

4. The tape device of claim 1 wherein the tape memory supports a plurality of boot techniques compatible with computers that implement an Extensible Firmware Interface.

5. The tape device of claim 1 further comprising firmware that enables the tape device to simulate being a non-tape device.

6. The tape device of claim 5 wherein the non-tape device is one of a CD device and a DVD device.

7. The tape device of claim 1 wherein the tape device is implemented by a tape drive coupled to a computer, the computer being configured to boot using at least one of the plurality of boot techniques.

8. The tape device of claim 7 wherein the computer implements an Extensible Firmware Interface (EFI) and wherein the tape device supports a plurality of EFI-compatible boot techniques.

9. The tape device of claim 1 wherein the tape device is implemented by a tape drive coupled to a plurality of computers having different operating systems, the plurality of computers are configured to boot using different bootloaders supported by the tape device.

10. The tape device of claim 1 wherein the tape device is implemented by a tape drive coupled to a plurality of computers having different operating systems, the plurality of computers are configured to boot based on different boot applications supported by the tape device.

11. The tape device of claim 1 wherein the tape device is configured to provide an extensible format that supports at least one of operating system changes and boot application changes.

* * * * *

UNITED STATES PATENT AND TRADEMARK OFFICE
CERTIFICATE OF CORRECTION

PATENT NO.        : 7,117,302 B2
APPLICATION NO.   : 11/068428
DATED             : October 3, 2006
INVENTOR(S)       : Bruce A. Lundeby et al.

Page 1 of 1

It is certified that error appears in the above-identified patent and that said Letters Patent is hereby corrected as shown below:

In column 9, line 10, in Claim 1, delete "fine" and insert -- frame --, therefor.

Signed and Sealed this

Thirtieth Day of June, 2009

JOHN DOLL
*Acting Director of the United States Patent and Trademark Office*